June 29, 1965 C. R. WAVAK 3,191,735
SPLINE LINER
Filed Feb. 28, 1963 2 Sheets-Sheet 1
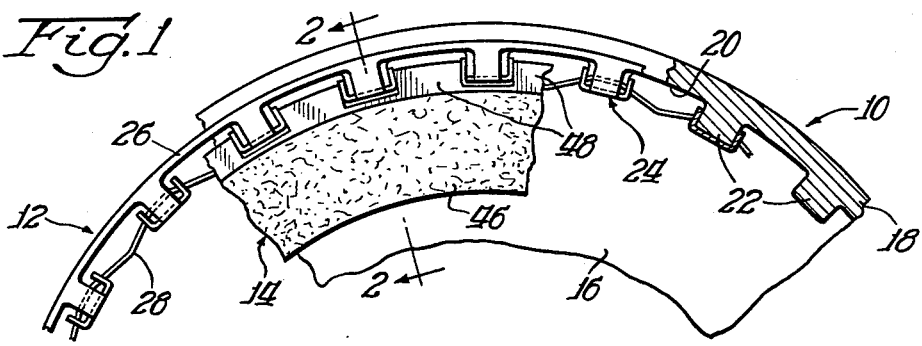
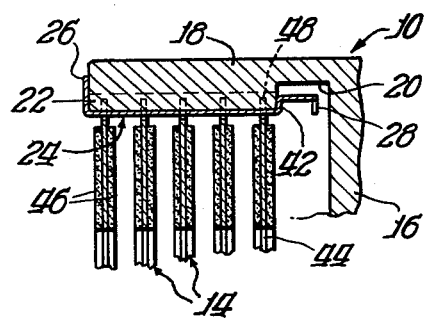
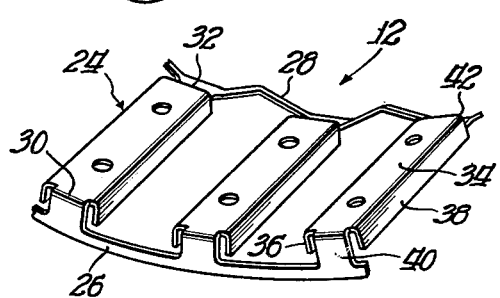
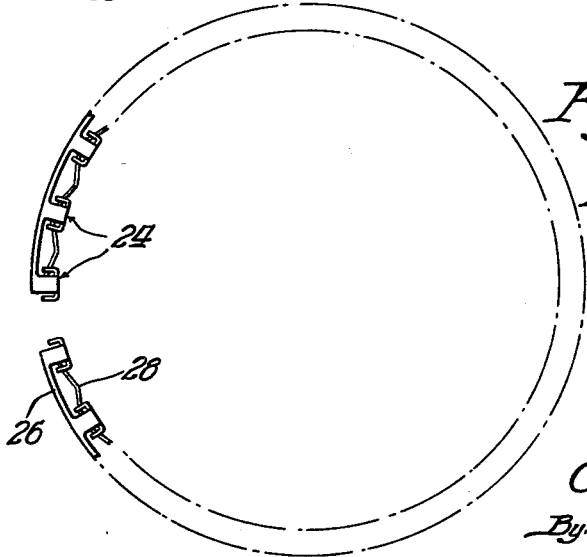
Inventor:
Charles R. Wavak
By: Frank R. Thrienport Atty.

June 29, 1965  C. R. WAVAK  3,191,735
SPLINE LINER
Filed Feb. 28, 1963  2 Sheets-Sheet 2
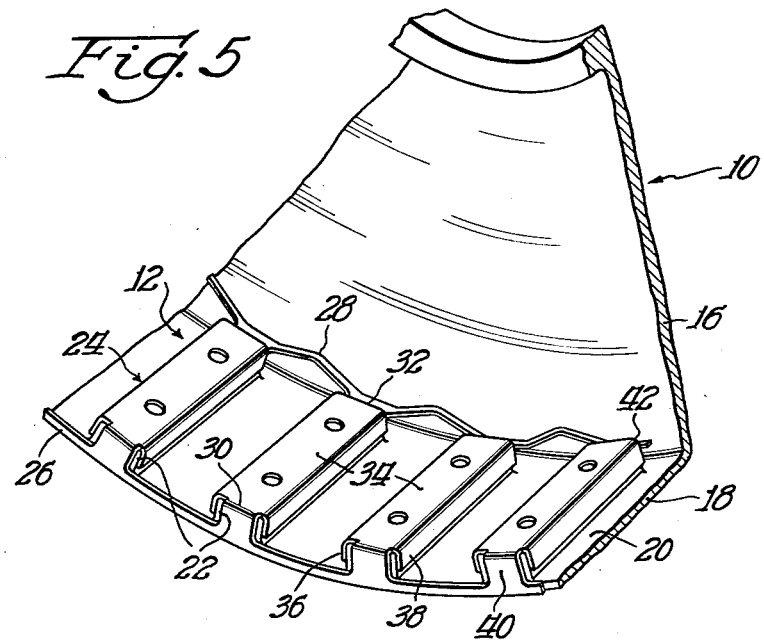
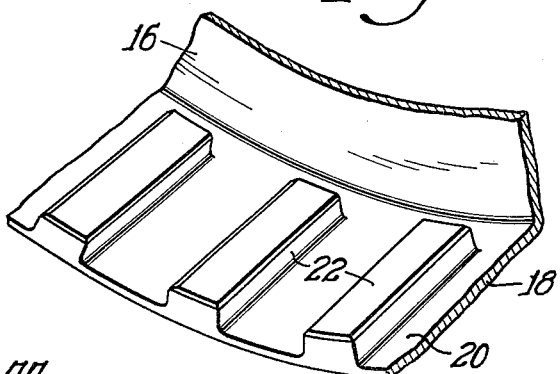
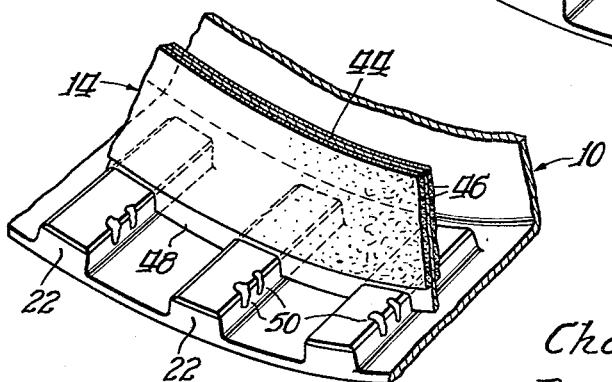
Inventor:
Charles R. Wavak
By: Frank R. Thinpont  Atty.

3,191,735
SPLINE LINER
Charles R. Wavak, Villa Park, Ill., assignor to Borg-Warner Corporation, Chicago, Ill., a corporation of Illinois
Filed Feb. 28, 1963, Ser. No. 261,585
3 Claims. (Cl. 192—110)

This invention relates to a liner for a spline arrangement for protecting spline teeth. More specifically it relates to a protective liner for covering teeth of a spline arrangement as, for example, in a housing for a multiple disc clutch pack as used in an automatic transmission.

One of the problems that has been encountered with spline teeth in a housing for a clutch pack as used in an automatic transmission, for example, is that these teeth become cut and chafed by the action of the teeth or serrated edges of the associated metal friction plates. This condition occurs because housings of this type are usually made of a soft metal such as aluminum. Heretofore when the spline teeth were damaged to an excessive extent by the action of the friction plates as they tend to rotate during operation of the mechanism the only alternative was to replace the complete housing, which, in an automatic transmission, is a very expensive item. By virtue of my invention this problem has been overcome. A spline liner can be inserted into the assembly as originally manufactured to prevent damage to spline teeth initially or can be inserted later as a repair measure.

Accordingly a principal object of this invention is to provide a capping arrangement comprising a plurality of interconnected spline caps for the spline teeth of an internal spline which is easy to manufacture, easy to insert into the spline and is effectively held in position without the necessity of a permanent fastening means. The latter feature obviously makes it easy to remove if that becomes necessary.

Another object is to provide in a strip arrangement a plurality of interconnected spline teeth caps that may be easily inserted into place to cover the individual spline teeth.

It is also an object to provide a spline liner wherein the caps are connected together at each end by integral connecting strips.

Still another object of the invention is to provide a clutch pack and liner combination which may be sold as a complete repair kit to prolong the life of the housing.

Other objects and features of the invention will be readily apparent to those skilled in the art from the specification and appended drawings illustrating a preferred embodiment of the invention in which:

FIGURE 1 is a partial front view showing the spline liner and a clutch disc with serrated edges in place in a spline arrangement in a portion of a clutch pack housing;

FIGURE 2 is a partial view in cross-section taken at the line 2—2 of FIGURE 1;

FIGURE 3 is a perspective view of a portion of the spline liner;

FIGURE 4 is a front view of a strip section of a spline liner bent into circumferential shape ready to insert into the spline arrangement of a clutch housing;

FIGURE 5 is a partial perspective of the spline liner in a clutch housing showing the liner caps in place on the spline teeth;

FIGURE 6 is a partial perspective of a portion of a clutch housing illustrating spline teeth in an undamaged condition;

FIGURE 7 is a partial perspective of a clutch housing illustrating damage to spline teeth caused by the serrated edges of a friction plate.

Referring now to drawings FIGURES 1 and 2 show a clutch housing 10 a spline liner 12 and a plurality of friction plates 14 as they would appear in an assembled condition. FIGURE 5 also illustrates a portion of a spline liner 12 assembled into the clutch housing 10.

The clutch housing 10 is of a generally cup-like design comprising a radially extending wall 16 and an axially extending portion 18 extending therefrom. On the internal periphery 20 of the portion 18 are formed a plurality of spline teeth 22. The clutch housing 10 may be made from a light metal such as aluminum.

The spline liner comprises a plurality of spline teeth caps 24 connected together by integral connecting strips 26 and 28 resulting in a unitary structure. Under proper circumstances the liner could also be made from a suitable hard plastic material. The connecting strips 26 and 28 are connected respectively to the ends 30 and 32 of the spline teeth caps 24. Each of the caps 24 is formed with a central section 34, side sections 36 and 38 depending from the central section 34 and end portions 40 and 42 to cover a spline tooth 22 when in place as illustrated at FIGURE 5. The connecting strip 26 is connected to the ends 30 of the caps 24 by the portion 40 depending from the central section 34. The strip 28 is connected to the opposite ends 32 of the caps 24 by means of a portion 42 depending from the ends 32. The spline liner 12 is preferably made in strip form from sheet metal of the desired gauge and of sufficient hardness to withstand the cutting tendency of the sharp edges of friction plates. Presumably, however, certain other materials as a plastic, for example, could also be used for this purpose under proper circumstances. As shown in FIGURE 4 the insert liner is not continuous but is split thus facilitating insertion over the spline teeth 22.

In the particular embodiment illustrated it will be observed that this construction with the strips 26 and 28 connecting the spline caps at the ends thereof is a particularly unique construction. First of all these strips carry and support the spline teeth caps during the manufacturing operation as the liner is stamped, for example, from strip metal. These strips also are attached to the caps in such a manner that they help to hold the liner in place in the complete assembly of the housing clutch pack and liner. In addition these strips are so connected to the cap ends that they do not interfere with the axial movement of the friction plates 14.

The friction plate 14 may consist of a central core section 44 with a friction lining material 46 fixed to one or both sides of the core section. As seen in FIGURE 1, for example, the friction plate is formed with a plurality of spline teeth 48 which would fit into the space between adjacent spline teeth 22 of the clutch housing 10. As best illustrated at 50 in FIGURE 7 the spline teeth formed on the core section of friction plate, being made of a harder material than the clutch housing, having a tendency to damage the spline teeth 22 after protracted operation of the clutch assembly.

With the insertion of a spline liner 12 into the clutch housing 10 it is apparent that the clutch housing may still be used even though the spline teeth 22 have become damaged. Obviously the action of a spline liner will require that the spline teeth of the friction plate be narrower than they would be in the originally designed housing. It will be observed that such a spline liner insert can be installed in equipment as originally manufactured or may be used as a repair item to preserve a clutch housing if damage has occurred to the latter as illustrated in FIGURE 7.

Thus it will be observed that my invention provides not only a liner device for capping spline teeth but one that uses to advantage strips for connecting the spline teeth caps at the ends thereof. By connecting the spline teeth caps in the manner described the liner is maintained as an integral unit and allows coaction with the complementary teeth of the friction plate. The connecting strips also advantageously help to hold the liner in place as a unit in the assembly.

While a certain preferred embodiment of the invention has been specifically disclosed, it is understood that the invention is not limited thereto as variations will be readily apparent to those skilled in the art and the invention is to be given its broadest possible interpretation within the terms of the following claims.

I claim:

1. A unitary spline liner insert for individually covering each of a plurality of individual spline teeth comprising: a plurality of spline teeth caps and integral means effective to connect said caps at the axial terminals thereof at positions beyond the axial terminals of said teeth for maintaining the caps in spaced relation as a unitary assembly.

2. A multiple disc clutch pack assembly kit comprising: a spline liner comprising means defining a plurality of separate teeth caps, means formed integral with said caps at the terminals thereof effective to connect said caps for thus maintaining said caps in spaced relation as a unitary assembly, and a plurality of friction plates having spline teeth complementary to the spacing between the spline teeth caps of the spline liner.

3. A multiple disc clutch assembly comprising: a cup-like housing member formed with a radially extending end wall section and an axially extending cylindrical wall portion connected to said end wall; a plurality of spline teeth formed on the inner periphery of said axially extending portion, a spline teeth protective insert for covering the spline teeth comprising a plurality of cap members respectively covering the spline teeth, said cap members being connected at each end by integrally formed strip sections for maintaining the cap members in spaced circumferential relation.

References Cited by the Examiner

UNITED STATES PATENTS

| 1,172,146 | 2/16 | Loomis | 192—69 |
| 2,449,662 | 9/48 | Leeson. | |
| 2,899,038 | 8/59 | Wellauer | 192—55 |
| 3,138,032 | 6/64 | Raso et al. | |

FOREIGN PATENTS

| 412,399 | 2/10 | France. |
| 1,141,102 | 3/57 | France. |

DAVID J. WILLIAMOWSKY, *Primary Examiner.*